United States Patent
Trantham et al.

(10) Patent No.: US 9,576,597 B2
(45) Date of Patent: Feb. 21, 2017

(54) DISK DRIVE SENSOR SELECTION

(71) Applicant: SEAGATE TECHNOLOGY LLC, Cupertino, CA (US)

(72) Inventors: Jon Trantham, Chanhassen, MN (US); Puskal Pokharel, Bloomington, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/656,348

(22) Filed: Mar. 12, 2015

(65) Prior Publication Data

US 2016/0267931 A1 Sep. 15, 2016

(51) Int. Cl.
*G11B 5/265* (2006.01)
*G11B 5/55* (2006.01)

(52) U.S. Cl.
CPC ........... *G11B 5/2652* (2013.01); *G11B 5/5543* (2013.01); *G11B 5/5539* (2013.01)

(58) Field of Classification Search
CPC ............. G11B 5/012; G11B 5/02; G11B 5/265–5/2652; G11B 5/3945–5/3974; G11B 5/49; G11B 5/4969–5/4992; G11B 5/59627; G11B 19/00–19/02
USPC .............. 360/55, 61–62, 75, 77.08, 121, 316
See application file for complete search history.

(56) References Cited

U.S. PATENT DOCUMENTS

| | | | |
|---|---|---|---|
| 5,754,354 A * | 5/1998 | Tomita | G11B 5/012 360/61 |
| 6,104,562 A * | 8/2000 | Ottesen | G11B 5/012 360/75 |
| 6,606,216 B1 * | 8/2003 | Liikanen | G11B 5/59683 360/77.08 |
| 7,075,742 B2 | 7/2006 | Ehrlich | |
| 7,570,451 B2 * | 8/2009 | Bedillion | G11B 5/59633 360/78.12 |
| 8,508,880 B2 * | 8/2013 | Gao | B82Y 10/00 360/75 |
| 8,724,252 B2 * | 5/2014 | Gao | B82Y 10/00 360/75 |
| 8,837,068 B1 | 9/2014 | Liao et al. | |
| 8,988,812 B1 * | 3/2015 | Brunnett | G11B 5/3964 360/75 |
| 9,070,406 B1 * | 6/2015 | Li | G11B 20/10268 |
| 9,099,125 B1 * | 8/2015 | Hattori | G11B 5/3912 |
| 9,147,431 B2 * | 9/2015 | Lammers | G11B 20/10268 |
| 9,245,556 B2 * | 1/2016 | Brunnett | G11B 5/4969 |
| 2012/0206830 A1 | 8/2012 | Gao et al. | |
| 2015/0255092 A1 * | 9/2015 | Macken | G11B 5/3951 360/324 |
| 2016/0049169 A1 * | 2/2016 | Haapala | G11B 5/59688 360/48 |

* cited by examiner

*Primary Examiner* — Wayne Young
*Assistant Examiner* — James L Habermehl
(74) *Attorney, Agent, or Firm* — Holzer Patel Drennan

(57) ABSTRACT

Implementations described and claimed herein includes a method comprising selecting a zone of one or more tracks on a disk drive having a plurality of magnetic sensors on a transducer head, determining a performance matrix related to the selected track zone, and selecting a first subset and a second subset of the plurality of magnetic sensors based on the determined performance matrix, wherein only the first subset of the plurality of magnetic sensors are used for data recovery in the selected track zone, and the second subset of the plurality of magnetic sensors are used for servo recovery.

18 Claims, 5 Drawing Sheets

DISK DRIVE SENSOR SELECTION

SUMMARY

One implementation described and claimed herein provides for a method comprising selecting a zone of one or more tracks on a disk drive having a plurality of magnetic sensors on a transducer head, determining a performance matrix related to the selected zone, and selecting a first subset and a second subset of the plurality of magnetic sensors based on the determined performance matrix, wherein only the first subset of magnetic sensors are used for data recovery in the selected zone and the second subset of magnetic sensors is used for servo recovery.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTIONS

Figure 1:
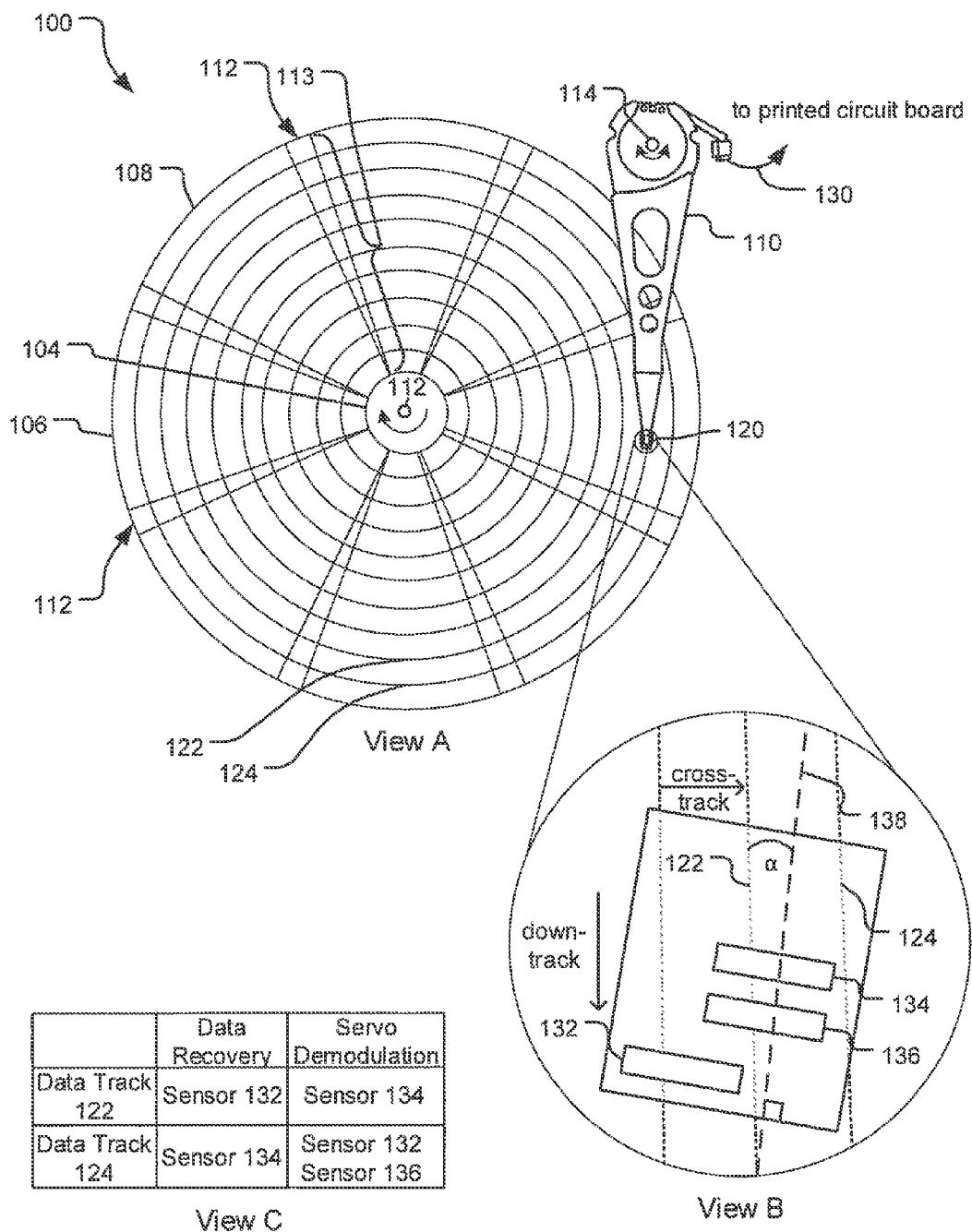
FIG. 1 illustrates a plain view of an example storage device.

During read and write operations to a hard disc drive by a transducer head, the transducer head can use one or more read sensors to recover data or read position information. Based on a read signal detected from the storage medium by the read sensors, data can be recovered. Alternatively, a storage system (e.g., a hard disc drive) can determine for the position of the read sensors with respect to the storage medium and from this information also determine the position of a write pole proximate to the read sensors on the transducer head. In this manner, the read sensors are useful in maintaining the alignment of the write pole with a target zone on the storage medium while writing data. In some embodiments, the present invention can be utilized in a two dimension magnetic recording (TDMR) system or a multi signal magnetic recording (MSMR) environment.

Under certain conditions, the angle between the data track and the transducer head can change the alignment between a write pole and a particular read sensor relative to one or more tracks on the storage medium. Moreover, the angle between the data track and the transducer head can change the alignment between the read sensors to one or more tracks on the storage medium. If the alignments do not change substantially as the head moves across the surface of the storage medium from inner diameter to outer diameter, then the read sensors and the write pole are considered to maintain a relatively consistent track. In contrast, even a small change in the angular alignment can affect the reading and writing of data on a magnetic recording disc with a high track density.

Maintaining alignment of a read sensor and a write pole of a transducer head on a target data track becomes more challenging as areal densities increase. For example, the distance in the data track direction between a write pole and a read sensor may be an order of magnitude greater than a relevant distance. The recovery of accurate servo positioning information may vary across a track, and the offset between writer and reader directly affects the position of the reader sensor while writing data. Some drives may have additional servo runout-cancellation fields that are written after the servo pattern was written. The recovery of these fields in addition to the other servo positioning information may vary across the drive surface due to sensor alignment. This recovery may be further exacerbated in servo systems that do not follow fixed servo tracks. For example, recovery may be exacerbated in servo systems that follow across various servo tracks for a single data track in order to compensate for "once-around" (i.e., the media not being perfectly concentric with the spindle).

A transducer head including a plurality of read sensors increases the likelihood that a read signal from at least one of the read sensors will return beneficial servo positioning information corresponding to the write pole location. While writing to a disc, a transducer head with multiple read sensors can better maintain alignment of the write pole with the desired target track. For example, multiple read sensors increase the likelihood that at least one of the read sensors will be located over the appropriate reference track for the write pole. Processing the read signal obtained from the read sensor over a bit (e.g., as recorded in a cell or island) in the appropriate reference track may allow a write pole to maintain a consistent track during a write process.

Multi-sensor recording heads can utilize multiple magnetic read sensors for better recorded data signal recovery, which results in higher areal density performance and higher drive capacity. Multiple sensors can also improve drive servo performance. The recovered signals from the multiple sensors can be combined to improve both the servo error rate for digital data (e.g., improve the recovery of track identification information, cylinder number, run-out data, etc.) and the quality of analog data (e.g., position error signal accuracy). Multiple read sensors for a single transducer head dramatically increase the probability that one or more of the multiple read sensors will be aligned on the appropriate reference track with the write pole at any operational angle.

The described technology includes a system wherein multiple magnetic read sensors can be independently selected for specific tasks (e.g., data recovery and servo demodulation) on a selected zone of one or more tracks. The selection is based on a performance matrix (i.e., each sensor's performance related to that task), which is based on a performance metric. For example, a performance metric can be a measurement of separation and skew angle of the sensors, sensor width, track alignment, recorded data rate, signal amplitude, servo demodulation error rate, servo non-repeatable runout, and other factors that affect performance of magnetic sensors.

For example, for a selected data track, a performance matrix can provide that specific read sensors with a low servo error rate perform better for servo demodulation and/or positioning accuracy on the selected track. It is advantageous to use the sensors that perform better with respect to certain attributes. Therefore, these sensors facilitating better servo performance are selected for servo demodulation based on the performance matrix for the selected track zone.

FIG. 1 illustrates a plan view of an example storage device 100 including a transducer head 120 on a distal end of an actuator arm 110 positioned over a media 108. During operation of the storage device 100, the transducer head 120 flies in close proximity about the surface of the media 108, while the media 108 is rotated by a spindle motor that rotates about an axis of rotation 112.

A rotary voice coil motor that rotates about an actuator axis of rotation 114 is typically used to position the transducer head 120 on a target data track (e.g., a data track 122) of the media 108 while one or more transducers (e.g., read or write elements) of the transducer head 120 read data from and write data to the target data track. A flex cable 130 provides the requisite electrical connection paths for the transducer head 120 while allowing pivotal movement of the actuator arm 110 during operation. The flex cable 130 connects a printed circuit board (PCB) (not shown) to the transducer head 120 and routes along the actuator arm 110 from the PCB to the transducer head 120. In other implementations, there is more than one transducer head 120, actuator arm 110, and/or media 108 in the storage device 100.

Referring to View A, the media 108 includes a number of servo sectors (e.g., a servo sector 112) arranged in rows (e.g., a row 113) extending radially between an inner diameter 104 and an outer diameter 106. In one implementation, each of the servo sectors 112 includes embedded information used for track seeking and track following. View B shows an exploded view of the transducer head 120 including three read sensors (e.g., read sensors 132, 134, and 136). The storage system can monitor read signals from each of the read sensors 132, 134, and 136 either for data recovery or using one of more of these read signals to determine the position of the writer (not shown) relative to the target data track.

For example, during read and write operations, the read sensors 132, 134, and 136 read the embedded servo patterns while accessing an individual data track. The servo patterns provide fine head position information used for centerline tracking. In other implementations, the transducer head 120 includes more than two read sensors. The read sensors may be arranged relative to one another in a variety of different configurations and offsets across the servo sectors and the data sector of the data tracks.

In one implementation, one or more of the read sensors 132, 134, and 136 are likely to be aligned over the same data track (e.g., a reference track) as the writer (not shown) so as to obtain accurate positioning information. In another implementation, one or more of the read sensors 132, 134, and 136 are likely to be aligned over a separate data track (e.g., a dedicated reference track or another data track containing position information pertaining to the target data track). Further, in one implementation, the transducer head 120 performs a read before write process to maintain the transducer head 120 over the target data track, although other writing processes may be employed.

At some radial locations, an axis 138 of the transducer head 120 is angled relative to a target data track (e.g., by an angle α, as shown). This angle is commonly referred to as the skew angle. The skew angle (α) of the transducer head 120 varies as the transducer head 120 moves radially across the media 108 between the inner diameter 104 and the outer diameter 106. Different skew angles (α) may be associated with different orientations of the read sensors 132 and 134 relative to the media 108. For example, a separation between the read sensors 132 and 134 can be defined relative to the media 108 by a separation in a down-track direction and also by a separation in a cross-track direction.

At some skew angles of the transducer head 120, one or more of the individual read sensors 132, 134, 136 may be in better position to perform read data recovery or to perform servo data recovery from a data sector or an underlying servo sector (e.g., a servo sectors 112) of the data tracks than other read sensor(s) of the transducer head 120. Therefore, a transducer head with multiple read sensors allows for generation of a more accurate data recovery and a position error signal (PES) than the PES achieved via a transducer head with a single read element.

In a multi-sensor recording head, in some implementations, only a subset of sensors may be active while recovering data. Additionally, the performance of each sensor to a specific task (e.g., data recovery and servo demodulation) can vary. For example, the servo error rate, separation of the sensors, or the data SNR effects performance of each sensor.

In this implementation, a data track zone can be selected on the media with the multiple sensors on the transducer head for data recovery and/or servo demodulation. A performance matrix is determined related to the selected track zone. Referring to View C, a determined performance matrix is shown. This matrix may be part of a larger table of preamp or channel parameter tables (e.g., "zone tables"), and may be generated while the drive is engineered or manufactured. The granularity of the sensor selection table can suit the behavior of a given recording head or drive. For example, the rows of the table may be for specific zones, or may be for specific tracks. The performance matrix shown in view C illustrates that for certain selected data tracks (e.g., data track 122, and data track 124) specific sensors perform better for certain tasks. Selection of the sensors is made based on a particular performance matrix for each sensor.

For example, for data track 122, sensor 132 may have higher SNR for data recovery compared to sensors 134, 136. On the other hand, for data track 124, sensor 134 may have higher SNR for data recovery than sensors 132, 136. Furthermore, for data track 122, only sensor 134 may generate adequate PES and therefore only one sensor may be used for servo modulation. Based on the performance of these sensors with respect to the required task, as outlined in the performance matrix, the sensors can be selected. Independently selecting better performing sensors for specific tasks increases overall system efficiency and performance.

Figure 2:
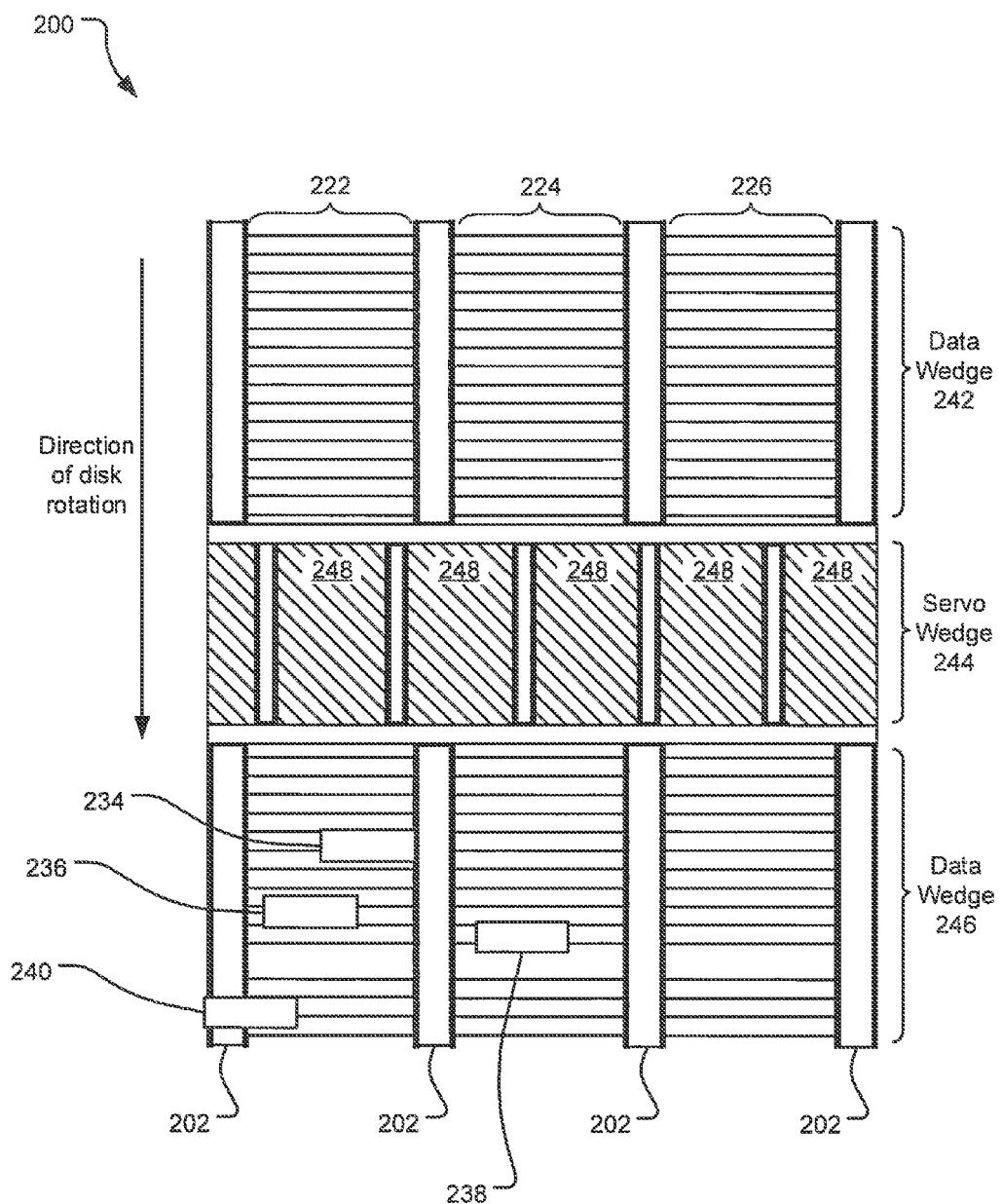
FIG. 2 illustrates an example transducer head with multiple read sensors.

FIG. 2 shows an example of multiple read sensors 234, 236, and 238 and their positioning over data wedges 242, 246 and servo wedges 244 on a transducer head of a data storage medium 200. The diagram illustrates read sensor selection and spacing in a transducer head. Data wedges 242 and 246 and a servo wedge 244 are shown across the width of data tracks 222, 224, and 226. Read sensors (e.g., read sensors 234, 236, and 238) are positioned over data tracks 222 and 224. The number and placement of read sensors may vary in various implementations. The contemplated number of read sensors is unlimited in the disclosed technology, although certain implementations may be limited by fabrication constraints or engineering choice. As shown, magnetic erase bands 202 form adjacent the data tracks 222 and 224. A write pole 240 is positioned off of track 222 and an erase band 202.

In this implementation, while recovering data over data track 222, it is likely that only the signals from sensors 234 and 236 may be used to recover data from data track 222, while the sensor 238 is inactive or shut off.

FIG. 2 also illustrates servo tracks (e.g., servo track 248). In one implementation, the ratio of servo tracks to data tracks may not be fixed. For example, it is possible that there are a predetermined number of servo tracks (e.g., five) to data tracks (three) in one implementation, as shown in FIG. 2. In other implementations, there could be a variable number of servo tracks to data tracks. In another implementation, the data tracks may not be concentric. For example, the servo pattern may be pre-written outside of the drive on one spindle, and when placed in the drive on a different spindle the servo tracks may not be concentric with rotation. Such implementations accommodate for eccentricities by changing servo tracks around the revolution of the disk.

The disclosed technology provides for determination that for the data track 222, sensors 234 and 236 may provide the best data recovery because they are approximately spaced at 25% of track pitch offset, for example. In this implementation, sensors 234 and 238 may provide the best servo demodulation because they are spaced at 120% of servo track pitch. In other embodiments, sensors 234 and 236 may provide the best areal density gain when they are spaced at about 10% to 25% of track pitch offset (or native track pitch)—and sensors 234 and 238 may provide the best servo metrics when they are spaced at about 80% to 120% of track pitch offset (or native track pitch). The sensor spacing of a second subset of sensors can be greater than the sensor spacing of a first subset. A performance matrix is determined for the selected data tracks 222 and 224. Based on this determination, a first subset of the sensors (e.g., sensors 234 and 236) is selected for data recovery and a second subset of sensors (e.g., sensors 234 and 238) is selected for servo demodulation in data track 222. On the other hand, another combination of sensors may be used for data recovery in servo track 226 and yet another combination of sensors may be used for servo demodulation.

Figure 3:
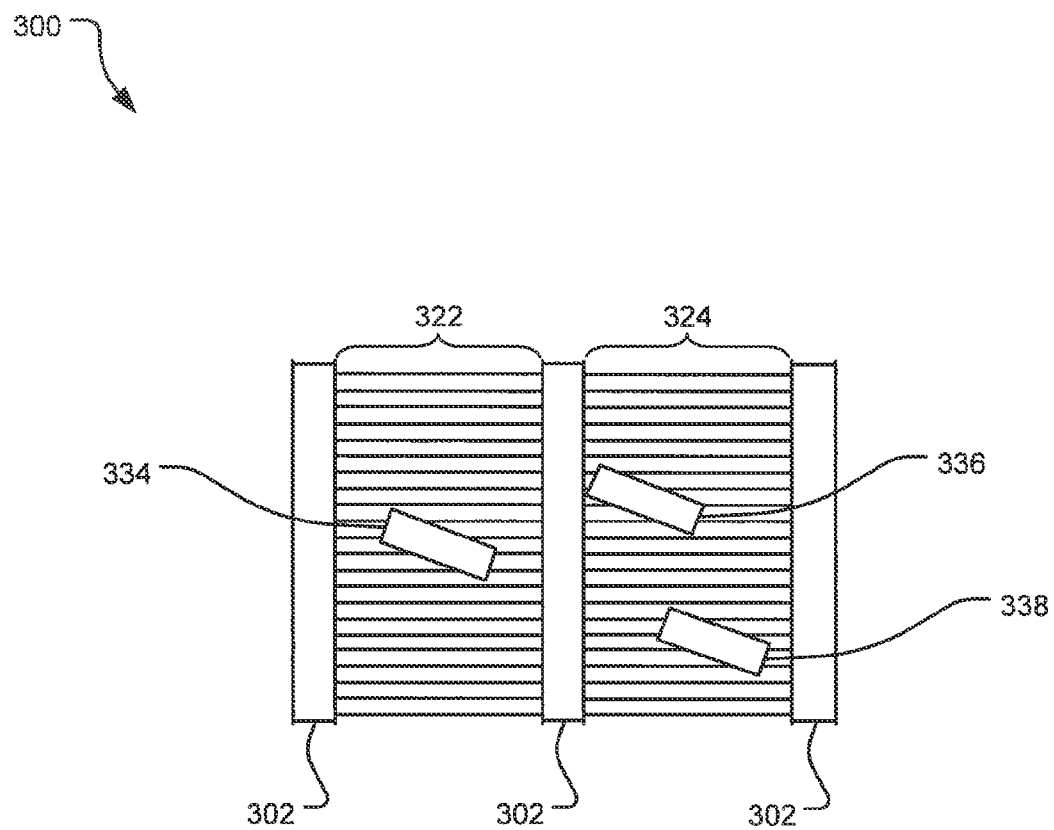
FIG. 3 illustrates a second example transducer head with multiple read sensors.

FIG. 3 illustrates an example recording head 300 with three sensors 334, 336, and 338 positioned over data tracks 322 and 324. There are erase bands 302 positioned adjacent the data tracks 322 and 324. This drawing illustrates read sensor selection and spacing in a transducer head when there are skewed sensor configurations. Due to the skew angle of the recording head 300 with respect to the recorded data, the selection of selected sensors for data recovery may change at different track positions across the surface of the storage medium.

In light of the skewed configurations, rather than trying to optimize reader spacing for both data recovery and servo demodulation, the disclosed technology includes specifically selecting better performing sensors for data recovery and servo demodulation based on a target zone. This facilitates independent selection of sensor elements for a specific task based upon performance results in better servo demodulation and positioning capability within the disk drive.

For example, FIG. 3 shows the alignment of the read sensors 334, 336, and 338 with a different skew angle. When recovering data from data track 324, for example, the selection of sensors 336 and 338 may yield a better recovered signal than from sensors 334 and 336. Therefore, for selected data track 324, a performance matrix determines that sensors 336 and 338 perform better for data recovery. Based on this determination, the sensors 336 and 338 are selected for data recovery.

Figure 4:
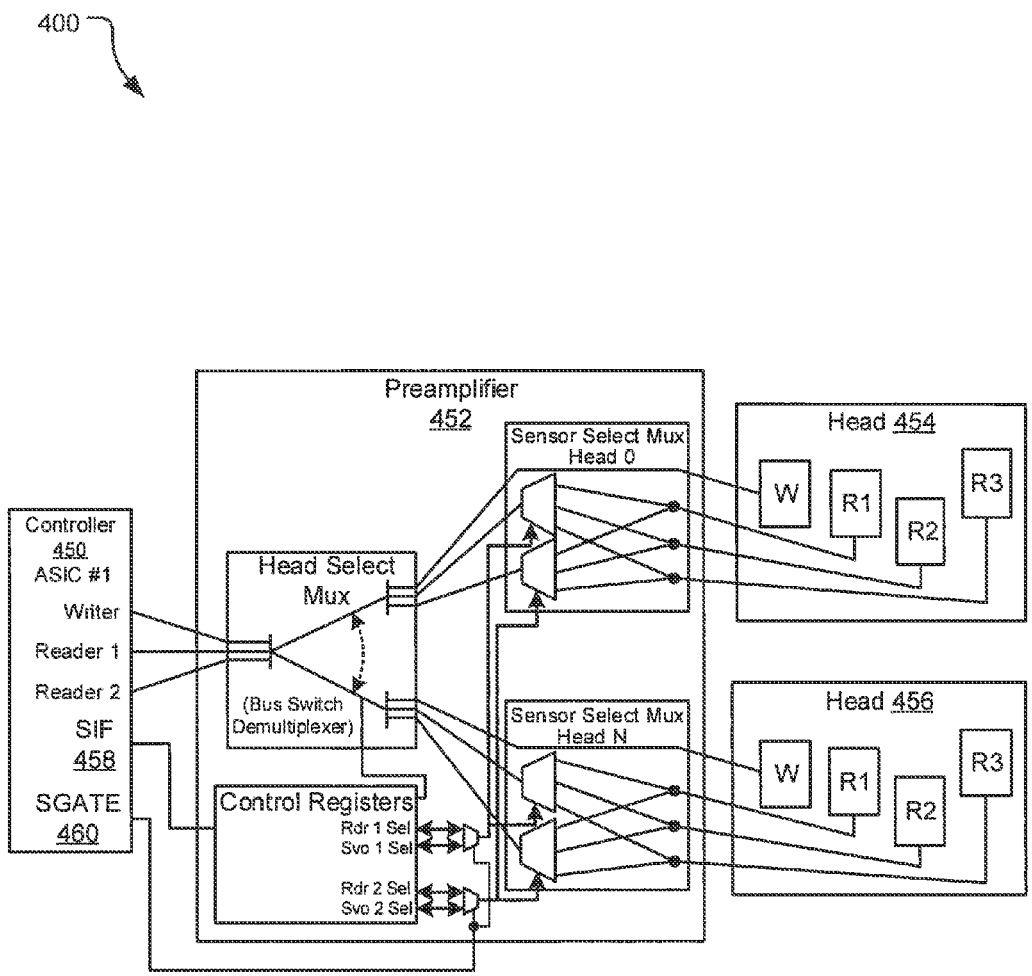
FIG. 4 illustrates an example electronics architecture for a disk drive.

FIG. 4 illustrates example electronics architecture 400 for a disk drive implementing the disclosed technology. The electronics architecture 400 includes one or more transducer heads having a plurality of sensors and a sensor selection module (not shown) configured to determine a track zone on a media and select subsets of the plurality of sensors based on the track zone to perform specific functions.

As shown in FIG. 4, the electronics architecture 400 includes a controller 450, a preamplifier 452, and two heads (e.g., head 454 and head 456). The preamplifier 452 may be located on a flexible printed circuit board that is electrically connected to multiple transducer heads 454, 456, etc.

The design of the preamplifier 452 in this implementation provides mapping from any sensor (e.g., sensors R1, R2, and R3) on any head (e.g., heads 454 and 456) to any reader output (e.g., Reader 1 and Reader 2). In this example, controller ASIC 450 contains two sets of reader inputs (Reader 1 and Reader 2), which are connected to preamplifier 452 via differential busses. In other implementations, other ASIC designs may have additional reader inputs.

The preamplifier 452 contains control registers (e.g., control registers 462), and switching circuitry for selecting sensors and connecting their amplified output to controller ASIC 450. In preamplifier 452, the switching function is accomplished through the usage of multiplexers or "muxes" (e.g., Head Select Mux, Sensor Select Mux Head O, and Sensor Select Mux Head N). Based upon the settings in the control registers, and the mode of operation (reading data versus recovering servo positioning information) as communicated by a servo gate signal (e.g., SGATE), the preamplifier 452 maps from the sensors to the reader outputs via the muxes to the controller 450. The muxes (e.g., Head Select Mux, Sensor Select Mux Head O, and Sensor Select Mux Head N) select input signals and forward the selected input signals into a select line, and can map any of the multiple sensors (e.g., R1, R2, and R3 on head 454 or head 456) selected by the control register to any reader output(s). It is noted that in other alternate implementations, a reduced mapping of reader sensor to ASIC input may be utilized to reduce preamp cost or improve performance.

The control registers 462 allow for the independent selection of a recording head (e.g., head 454 or head 456) and multiple read sensors (e.g., R1, R2, and R3 on head 454 or head 456) within the recording head. Programming of the control registers can be accomplished over a serial interface (e.g., SIF 458). Programming of the control registers can be changed, for example, during a seek operation.

The control registers 462 include an additional set of sensor selection registers (e.g., Svo 1 Sel, Svo 2 Sel, Rdr 1 Sel, and Rdr 2 Sel) added to the preamplifier 452. Each set of the sensor selection registers is designated (predetermined during manufacturing) for specific performance tasks (e.g., Rdr 1 Sel, and Rdr 2 Sel may be designated for data recovery sensors and Svo 1 Sel and Svo 2 Sel may be designated for selecting servo demodulation sensors).

As provided above, a servo gate signal (e.g., SGate 460) routes from the controller 450 to the preamplifier 452. SGate 460 selects which set of sensor selection registers (e.g., Svo 1 Sel or Svo 2 Sel) is currently active. The sensor selection can change depending upon whether the recording head is over data wedges or over servo wedges on the data tracks.

The mapping from the sensors to the reader outputs occurs based on a determined performance matrix. For example, controller 450, which comprises a writer output and two reader inputs (Reader 1 and Reader 2), SIF, and SGATE, initiates a data recovery operation. The controller 450 can select a data track zone for the data recovery. The controller 450 determines a performance matrix related to the selected data track zone based on prior determination of sensor performance during manufacturing. Based on the determined performance matrix, the controller 450 designates certain of sensors R1 and R2 for data recovery and other sensors for servo demodulation. Subsequently, the controller 450 sets the control registers based on the sensor designations. The sensor selection registers designated for data recovery (e.g., Rdr 1 Sel and Rdr 2 Sel) can select a subset of sensors (e.g., R1 and R2 on head 454) based on the determined performance matrix for data recovery (e.g., sensors with better SNR).

In another implementation, controller 450 initiates a servo demodulation operation. The controller 450 can select a track zone for the servo demodulation. The controller 450 determines a performance matrix related to the selected track zone based on prior determination of sensor performance during manufacturing. The sensor selection registers designated for servo demodulation (e.g., Svo 1 Sel and Svo 2 Sel) can select a subset of sensors (e.g., R2 and R3 on head 456) based on the determined performance matrix for servo demodulation (e.g., sensors with lower servo demodulation error).

Depending on the implementation, the number of muxes, control registers, sensors, and transducer heads can vary. It is noted that the switching network may not be limited to selecting solely from a single recording head. For example, the switching network shown in FIG. 4 can be altered to allow for the simultaneous selection sensors from more than one recording head (e.g., two different recording heads), and this selection can vary depending upon the mode of operation. In addition, in other implementations, there may be other key signals between the controller 450 and the preamplifier 452, such as a write enable signal and a power save signal (not shown).

In another implementation, other existing signal paths between the controller 450 and the preamplifier 452 may be used (e.g., a power save signal) for SGate 460 signal communication or transmission. In yet another implementation, preamplifier 452 can demodulate SGate 460 internally and control the muxes (e.g., by a phase-locked loop (PLL)).

Figure 5:
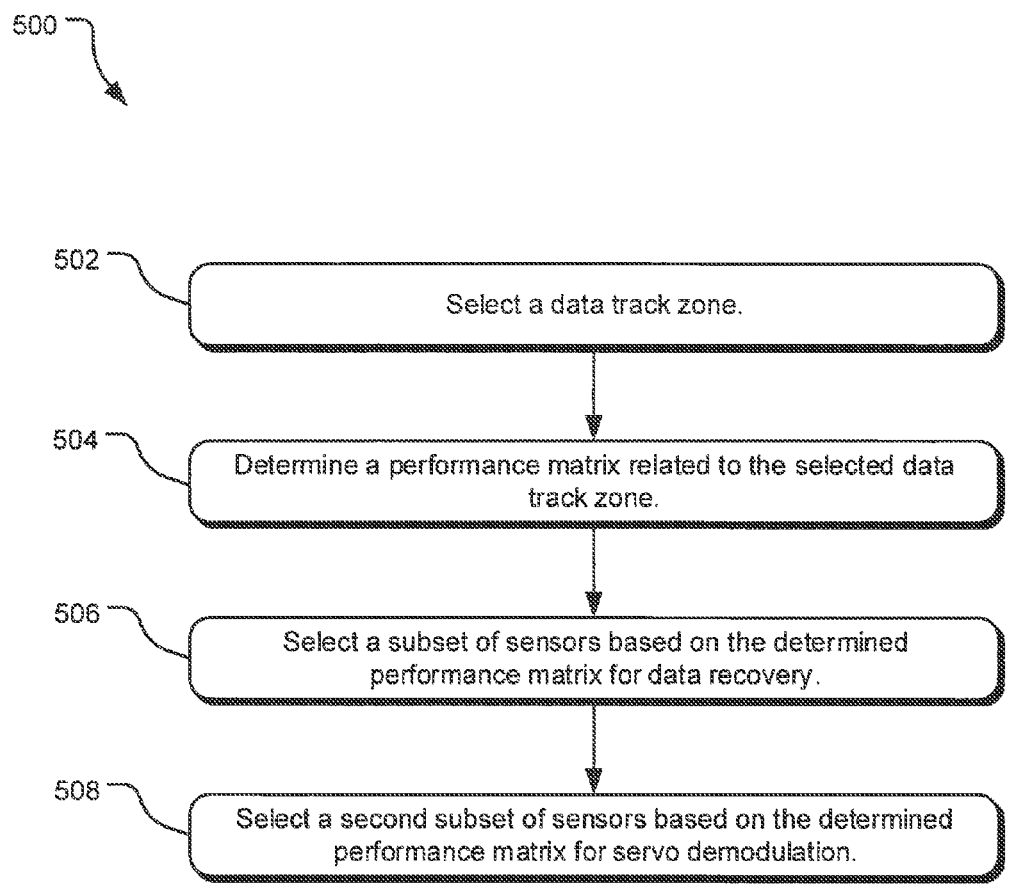
FIG. 5 is a flowchart of example operations for selecting sensors based on a performance matrix.

FIG. 5 shows example operations 500 for a method of selecting magnetic sensors for data recovery and servo recovery based on a determined performance matrix. A selecting operation 502 selects a zone of one or more tracks on a disk drive having a plurality of sensors on a transducer head for a specific task (e.g., data recovery or servo demodulation). There may be any number of sensors and transducer heads.

A determining operation 504 determines a performance matrix related to the selected track zone based on prior determination of sensor performance for data recovery during manufacturing (e.g., sensors with better SNR).

A selecting operation 506 selects a first subset of the plurality of sensors based on the determined performance matrix, the first subset of sensors including less than all of the plurality of sensors, wherein only the first subset of sensors are selected for data recovery in the selected track zone. The performance matrix is based on a performance metric. For example, the first subset of the plurality of read sensors may be selected to assist in determining the read location based on the sensors' measured performance in regard to a data recovery rate.

A selecting operation 508 selects a second subset of the plurality of read sensors based on the determined performance matrix for servo demodulation. The performance matrix is based on a performance metric. For example, the second subset of the plurality of read sensors may be selected based on measured sensor performance for servo demodulation during manufacturing related to a calibration operation revealing the sensors' performance in regards to radial location of the transducer head. Or, in another implementation, the second subset of the plurality of read sensors may be selected based on a servo system error rate performance metric.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   selecting a zone of one or more tracks on a disk drive having a plurality of magnetic sensors on a transducer head;
   determining a performance matrix related to the selected zone; and
   selecting a first subset and a second subset of the plurality of magnetic sensors based on the determined performance matrix so that only the first subset is used for data recovery in the selected zone and the second subset is used for servo recovery in the selected zone.

2. The method of claim 1, wherein determining the performance matrix further comprises determining the performance matrix based on a performance metric.

3. The method of claim 2, wherein determining the performance metric is a measurement of a servo demodulation error rate, or a servo non-repeatable runout performance.

4. The method of claim 2, wherein determining the performance metric is a measurement of a recorded data rate, or a separation of the plurality of magnetic sensors.

5. The method of claim 1, wherein selecting a subset of sensors further comprises using a servo gate signal to select a sensor selection register.

6. The method of claim 1, further comprising selecting a first subset and a second subset of the plurality of magnetic sensors from more than one recording head.

7. The method of claim 1, wherein the first subset is a single magnetic sensor and the second subset is a different single magnetic sensor.

8. The method of claim 1, wherein one of the first or second subsets consists of two magnetic sensors and another of the first or second subsets consists of one magnetic sensor.

9. A system comprising:
   a transducer head having two or more sensors;
   a sensor selection module configured to select a first subset of the sensors to read data, the first subset sensors includes less than all of the sensors; and
   a servo gate signal to select a sensor selection register.

10. The system of claim 9, wherein the sensor selection module is further configured to select the first subset based on a performance matrix related to a track zone and the system comprises a two dimension magnetic recording system or a multi signal magnetic recording system.

11. The system of claim 9, wherein the sensor selection module is further configured to select a second subset of the plurality of sensors to read servo signals.

12. The system of claim 9, further comprising a servo gate signal to select a sensor selection register for either servo recovery or data recovery.

13. The system of claim 9, wherein the servo gate signal is transmitted via other existing signal paths between a controller and a preamplifier.

14. The system of claim 9, wherein the servo gate signal is demodulated by a preamplifier internally and controls multiplexers for sensor selection.

15. One or more non-transitory computer-readable storage media encoding computer-executable instructions for executing on a computer system a computer process, the computer process comprising:
    selecting a data track zone on a disk drive having a plurality of magnetic sensors on a transducer head;
    determining a performance metric related to the selected track zone;
    selecting a first subset of the plurality of magnetic sensors based on the determined performance metric, the first subset of the plurality of magnetic sensors including less than all of the plurality of sensors, only the first subset of the plurality of sensors are used for data recovery or reading in the selected track zone and selecting a second subset of the plurality of magnetic sensors to read signals for servo modulation based on the determined performance metric.

16. The one or more non-transitory computer-readable storage media of claim 15, wherein the first subset comprises a first sensor spacing and the second subset comprises a second sensor spacing that is greater than the first sensor spacing.

17. The one or more non-transitory computer-readable storage media of claim 16, wherein the first sensor spacing is about 10 to 25 percent of a track pitch offset and the second sensor spacing is about 80 to 120 percent of the track pitch offset.

18. The one or more non-transitory computer-readable storage media of claim 15, further comprising selecting a first subset and a second subset of the plurality of magnetic sensors from more than one recording head.

\* \* \* \* \*